(12) United States Patent
Carrer et al.

(10) Patent No.: US 8,112,478 B2
(45) Date of Patent: Feb. 7, 2012

(54) EMAIL AND DISCUSSION FORUM SYSTEM

(75) Inventors: Marco Carrer, Reading, MA (US);
Gopalan Arun, Nashua, NH (US);
Xiaohua Lu, Nashua, NH (US); David Mor, Merrimack, NH (US)

(73) Assignee: Oracle International Corporation, Redwood Shores, CA (US)

( * ) Notice: Subject to any disclaimer, the term of this patent is extended or adjusted under 35 U.S.C. 154(b) by 1130 days.

(21) Appl. No.: 11/374,402

(22) Filed: Mar. 13, 2006

(65) Prior Publication Data
US 2007/0214216 A1 Sep. 13, 2007

(51) Int. Cl.
*G06F 15/16* (2006.01)
(52) U.S. Cl. ......... 709/204; 709/205; 709/206; 709/207
(58) Field of Classification Search .................. 709/206, 709/204
See application file for complete search history.

(56) References Cited

U.S. PATENT DOCUMENTS

| 7,233,982 B2* | 6/2007 | Shenefiel ................... 709/219 |
| 7,254,611 B1* | 8/2007 | Clark et al. ................. 709/204 |
| 2002/0019827 A1* | 2/2002 | Shiman et al. ............. 707/200 |
| 2004/0158611 A1* | 8/2004 | Daniell et al. ............. 709/206 |
| 2005/0080852 A1* | 4/2005 | Kelley et al. ............... 709/206 |
| 2006/0101119 A1* | 5/2006 | Qureshi et al. ............ 709/206 |
| 2007/0115936 A1* | 5/2007 | Newton ..................... 370/352 |
| 2007/0185964 A1* | 8/2007 | Perlow et al. .............. 709/207 |

* cited by examiner

*Primary Examiner* — Duyen Doan
(74) *Attorney, Agent, or Firm* — Kraguljac Law Group, LLC

(57) ABSTRACT

Systems, methods, and media associated with coordinating a discussion forum application and an email application are described. One example system includes a data store and a coordination logic. The data store may store a discussion forum message in a data structure accessible to both an email logic and a discussion forum logic. The coordination logic may provide access to the discussion forum message for the email logic and the discussion forum logic. The coordination logic may also maintain read status consistency for the discussion forum message and cause threading information associated with the discussion forum message to be honored.

20 Claims, 6 Drawing Sheets

EMAIL AND DISCUSSION FORUM SYSTEM

BACKGROUND

Historically, newsgroup applications and email applications have been separate applications. Attempts to integrate the two applications have been cumbersome at best. Early newsgroup applications may have relied on a standalone component like an NNTP (network news transport protocol) client to interact with other newsgroup applications and users. Early email applications may similarly have relied on a separate component like an SMTP (Simple Mail Transport Protocol) client to interact with other email applications and users via SMTP. These two types of applications typically had their own data stores and their own data storage schema.

As the World Wide Web developed, newsgroups became widely accessible through web browsers. These web-based newsgroups facilitated posting messages, reading messages, following threads, and so on. Users became comfortable with the web-based interface to newsgroups and the threading associated with discussions. However, newsgroups still remained separate and distinct from email applications. For example, email was still typically used for more personal communications while newsgroups were typically used for more group-oriented communications. In an early attempt to bridge between the two application types, a newsgroup application may have been configured to send an email notification to an email application when a message was posted to a thread in a discussion forum in which a user was interested. However in these minimally integrated systems it may have been difficult, if possible at all, to participate in a discussion forum using an email client.

In a conventional set of systems, a user may have interacted with a discussion forum by posting a message. This message would not automatically be available to an email application. In fact, the email application may not even have been aware of the discussion forum activity. Thus, a conventional system may have sent a notification email to the email application. The notification email may even have included the text of the discussion forum message. The receiving email application would be able to read the message, but no discussion forum type activities were typically possible from the email application.

These types of early integrations essentially duplicated messages and thus doubled the amount of storage used per message. Additionally, a user would be confronted with two "new" messages for each discussion forum message. The user would be presented with a new message in their email application and when the user accessed a discussion forum application the user would be confronted with another "new" message even though the user may have already read the message in an email application. Deleting or responding to two messages for every individual message could easily become burdensome, confusing, and tiring. Additionally, coordinating backup of duplicated messages may have complicated this type of conventional system.

Upon receiving a notification email, a user typically would not have been able to interact with the discussion forum system message through an email application. For example, a user would not be able to reply to a discussion forum message from an email application. Additionally, the user would not be able to follow the series of messages related to the message from an email application. Thus, these loosely integrated systems did not honor the threading information or provide the threaded experience associated with discussion forum messages.

BRIEF DESCRIPTION OF THE DRAWINGS

The accompanying drawings, which are incorporated in and constitute a part of the specification, illustrate various example systems, methods, and other examples of various aspects of the invention. It will be appreciated that the illustrated element boundaries (e.g., boxes, groups of boxes, or other shapes) in the figures represent one example of the boundaries. One of ordinary skill in the art will appreciate that in some cases one element may be designed as multiple elements, multiple elements may be designed as one element, an element shown as an internal component of another element may be implemented as an external component and vice versa, and so on. Furthermore, some elements may not be drawn to scale.

DETAILED DESCRIPTION

Figure 1:
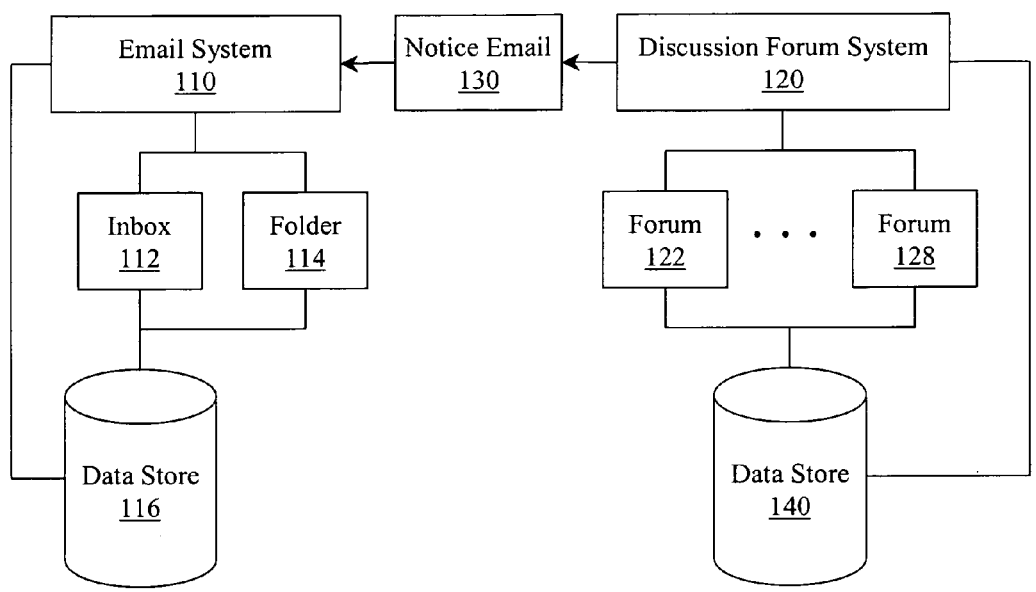
FIG. 1 illustrates a conventional email system interacting with a conventional discussion forum system.

Example systems and methods facilitate providing a discussion forum experience for an email application by sharing data (e.g., discussion forum message) between newsgroup applications (e.g., discussion forums) and email applications. In one example, a discussion forum system (e.g., browser client, RSS (Rich Site Summary) reader) is layered over an email system to provide a single environment for personal (e.g., email) communications and group (e.g., forum) communications. The email system may include, for example, IMAP reader functionality, SMTP sender functionality, and so on. Thus, two interfaces (e.g., email, discussion forum) may be provided for a system that includes message storage, shared access control, and business logic. The shared system facilitates sharing data and the logic that controls how data can be accessed (e.g., input, changed).

Example systems and methods facilitate providing a visible and interactive discussion forum system presence in an email system. For example, users may be able to respond to discussion forum messages from within an email application, may be able to access archived messages associated with a discussion forum, may be able to interact with discussion forum threads within the context of their email system, and so on. In one example, discussion forums will be accessible via folders available to an email system. In one example, a folder associated with a forum may be shared between multiple email users attempting to access its threads. To a user, a folder and a thread may become logically indistinguishable. Thus, traditionally separate discussion forum applications and email applications may be logically combined into a single generic application for exchanging opinions, questions, and so on. The example systems and methods provide two views into the logically single generic application.

In one example, messages manipulated (e.g., posted) using a discussion forum client may be stored in a data store that is also accessible to an email client. Both the discussion forum client and the email client may interact with the data store through common and/or special purpose logics. These logics may include, for example, an access logic, a business logic, and so on. An access logic may be configured to control visibility, to control membership, to implement privileges (e.g., read, write, . . . ), and so on. A business logic may be configured to implement (e.g., enforce) policies (e.g., size limits). In one example, a business logic may include a common portion, a portion specific to an email client, and a portion specific to a discussion forum client. While two logics are described, it is to be appreciated that in some examples one, two, or more logics may individually and/or cooperatively provide business and/or access logic.

Using a shared folder in a shared data store facilitates making available to an email client a message manipulated (e.g., read, written) by a discussion forum client. Similarly, using a shared data store facilitates making available to a discussion forum client a message manipulated by an email client. Furthermore, manipulations performed in the discussion forum client will be propagated into messages available to the email system and manipulations performed by the email client will be propagated into messages available to the discussion forum client.

Unlike conventional systems that may have had separate data stores for discussion forum systems and for email systems, example systems may employ a single logical and/or physical data store. Thus, in one example, a discussion forum client and an email client may be considered two different interfaces to the underlying threaded conversations stored in the single data store. From the email perspective, a separate email folder may be provided for each forum in which a user is interested. The folder may facilitate taking actions including, for example, reading a message, re-arranging messages, organizing messages, deleting a message, responding to a message, restoring a message, blocking access to a message, tracing a set of messages related to a message (e.g., following a thread), and so on. Thus, the folder facilitates honoring the threading information associated with a message and facilitates providing a discussion forum experience in an email application. In one example, an email folder associated With a forum may logically group its message by conversation thread and therefore may facilitate taking actions on topics including, for example, re-arranging topics, trimming topics, deleting a topic and its messages, responding to a topic, restoring a topic, and blocking access to a topic.

In one example, a user may selectively (de)activate the discussion forum related shared folder(s) in their email application. For example at different times a user may have different preferences concerning real-time on-the-fly access versus off-line batch review. By way of illustration, a user may wish to temporarily suspend access to the discussion forum. In this case, messages will be stored in the data store but only logically made available to the email application when discussion forum access is re-activated. A user may select this option to prevent discussion forum based interruptions while working on other topics.

The data store may be, for example, a database. The database may store, for example, messages, user settings, forum definitions, message definitions, access control definitions, policy definitions, and so on. The single logical and/or physical data store thus facilitates maintenance of a forum, thread, message, and so on. Conventionally, with multiple unrelated data stores, if possible at all, it would have been difficult to perform parallel maintenance to retain consistency between separate discussion forum and email applications. In example systems and methods, parallel maintenance is not necessary since a single instance of a message may be stored in a shared folder that can be accessed by both a discussion forum application and an email application.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer component", as used herein, refers to a computer-related entity (e.g., hardware, firmware, software, software in execution, combinations thereof). Computer components may include, for example, a process running on a processor, a processor, an object, an executable, a thread of execution, a program, and a computer. A computer component(s) may reside within a process and/or thread of execution. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data that can be read by a computer. A computer-readable medium may take forms, including, but not limited to, non-volatile media (e.g., optical disk, magnetic disk), volatile media (e.g., semiconductor memory, dynamic memory). Common forms of computer-readable mediums include floppy disks, hard disks, magnetic tapes, CD-ROMs, RAMs, ROMs, and so on.

"Logic", as used herein, includes but is not limited to hardware, firmware, software and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. In some examples, logic may be fully embodied as software. Where multiple logical logics are described, it may be possible in some examples to incorporate the multiple logical logics into one physical logic. Similarly, where a single logical logic is described, it may be possible in some examples to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer instructions and/or processor instructions that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, computer-readable and/or executable instructions may be located in one logic and/or distributed between multiple communicating, co-operating, and/or parallel processing logics and thus may be loaded and/or executed in serial, parallel, massively parallel and other manners.

Suitable software for implementing various components of example systems and methods described herein may be developed using programming languages and tools (e.g., Java, C, C#, C++, SQL, APIs, SDKs, assembler). Software, whether an entire system or a component of a system, may be embodied as an article of manufacture and maintained or provided as part of a computer-readable medium. Software may include signals that transmit program code to a recipient over a network or other communication medium.

"User", as used herein, includes but is not limited to, one or more persons, software, computers or other devices, or combinations of these.

"Category", as used herein, refers to an abstract container that can be used to model grouping concepts. Categories may be nested and may contain other categories. Categories may contain forums. A category may be identified by a unique identifier (e.g., java long number) and/or by a full path. A category exposes properties and settings including, name, description, creation time, creator, last post, and access control list. A category may also be referred to as a facility.

"Forum", as used herein, refers to a container that contains threads and messages. Forums may be organized by theme and thus messages posted to a forum are related to a given subject matter. Forums may also be referred to as boards, discussion forums, or on-line forums. A forum can be identified by a unique identifier (e.g., java long number) and/or by a full path. A forum exposes properties and settings including, name, description (e.g., theme), creation time, creator, number of threads, number of messages, last post, board policies (e.g., board behavior parameters), and email address. Forum policies facilitate customizing forum behavior by, for example, defining conditions in which a message in the forum can be edited, deleted, and so on. The forum email address facilitates storing and threading email messages sent to the forum address.

"Thread", as used herein, refers to a set of messages stemming from the same root message. A thread and its replies belong to one and only one board. The subject of the thread root message defines the discussion topic. Thread messages are organized in a tree structure where replies are a child of the message to which they replied. "Topics" and "discussion threads" are analogous to "thread". A thread can be identified by a unique identifier (e.g., java long number) together with the identifier of its parent board. A thread exposes properties and settings including, post date, post author, post subject, number of replies, and last post.

"Message", as used herein, refers to a post to a board or a reply to a message. One skilled in the art will understand that the first message in a thread is often referred to as the thread itself while replies are referred to as messages. A message can be identified by a unique identifier (e.g., java long number) as well as the identifier of its parent thread and board. A message exposes properties and settings including, post date, post author, post subject, and parent message.

Some portions of the detailed descriptions that follow are presented in terms of algorithm descriptions and representations of operations on electrical and/or magnetic signals capable of being stored, transferred, combined, compared, and otherwise manipulated in hardware. These are used by those skilled in the art to convey the substance of their work to others. An algorithm is here, and generally, conceived to be a sequence of operations that produce a result. The operations may include physical manipulations of physical quantities. The manipulations may produce a transitory physical change like that in an electromagnetic transmission signal.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time.

It will be appreciated that electronic and software applications may involve dynamic and flexible processes and thus that illustrated blocks can be performed in sequences different than the one shown and/or blocks may be combined or separated into multiple components. In some examples, blocks may be performed concurrently, substantially in parallel, and/or at substantially different points in time.

FIG. 1 illustrates a conventional email system 110 and a conventional discussion forum system 120. Discussion forum system 120 may service or interact with a number of discussion forums (e.g., 122 through 128). Messages may be posted to these forums, threads may be followed in these forums, a moderator may perform maintenance for these forums, and so on. The discussion forum system 120 may store messages associated with the discussion forums (e.g., 122 through 128) in data store 140. Discussion forum system 120 may also use data store 140 to store control information, historical information, configuration information, and so on.

Discussion forum system 120 may be configured to selectively provide a notice email 130 to email system 110. For example, if a user of email system 110 is interested in discussion forum 122, discussion forum system 120 may provide a notice email 130 to email system 110 when a message is posted to discussion forum 122. Notice email 130 may then physically be stored in data store 116 and logically provided to the user in inbox 112 and/or folder 114. Note that data store 116 is separate from data store 140. This leads to duplicate messages, complicated parallel system maintenance, and so on. Note also that while discussion forum system 120 provides messages to email system 110, there is no return traffic because email system 110 is not configured to participate in a discussion forum.

Figure 2:
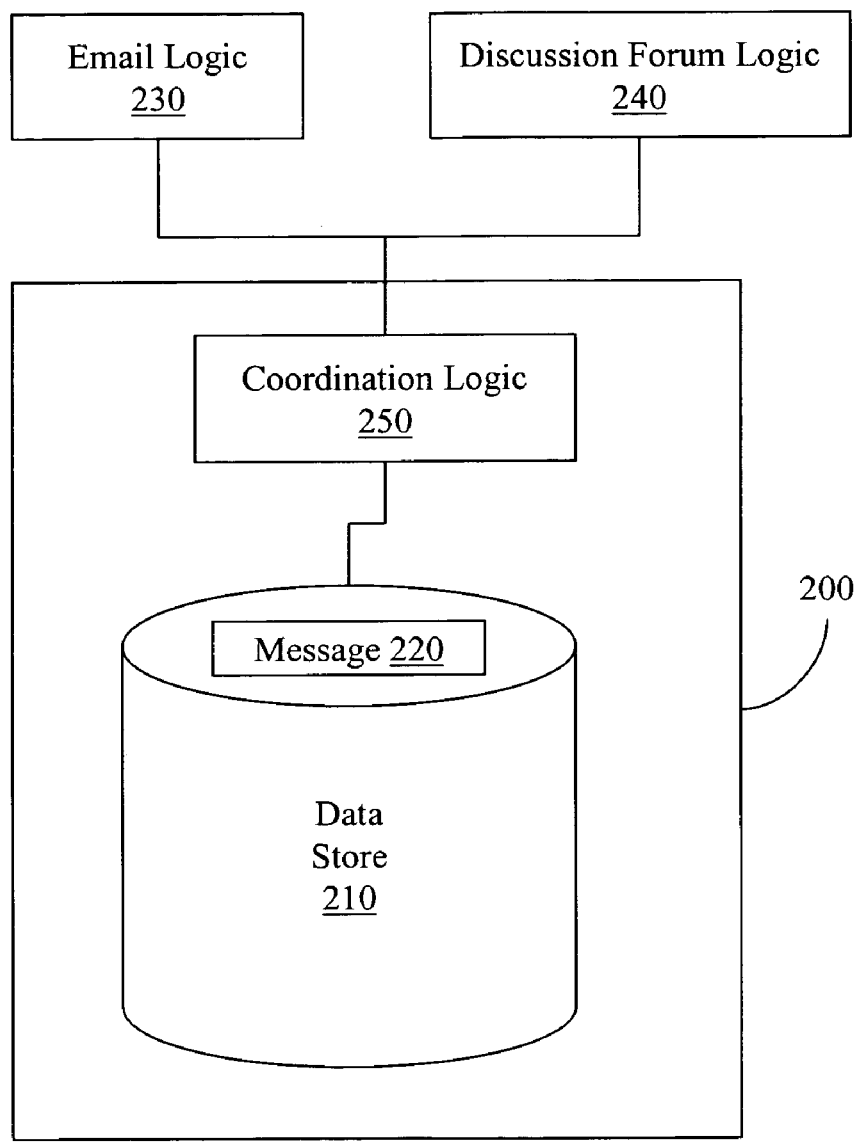
FIG. 2 illustrates an example email and discussion forum system.

FIG. 2 illustrates an example email and discussion forum system 200. System 200 may include a data store 210 that is configured to store a discussion forum message 220. In one example, the data store 210 may be a database. The database may be configured to store various items. For example, the database may store discussion forum message 220, information concerning the discussion forum message 220, the discussion forum with which message 220 is associated, and so on. The related information may include, for example, a discussion forum message definition, a user setting, a forum definition, an access control definition, a policy definition, and so on.

Information concerning message 220, the discussion forum with which message 220 is associated, and/or a user accessing the message may be stored in instances of various data types. Thus, the database may be configured to store instances of various data types, various objects, and so on. For example, data store 210, whether implemented as a database or other type of data store, may be configured to store instances of a category datatype, a forum datatype, a thread datatype, a message datatype, and so on. Storing these instances in data store 210, which is accessible to email logic 230, discussion forum logic 240, and coordination logic 250 may facilitate maintaining read consistency between logics.

The discussion forum message 220 may include an RFC (Request For Comment) 822 reference header field and an RFC 822 in-reply-to header field. While two RFC 822 headers are described, it is to be appreciated that in other examples other header fields, trailer fields, and/or metadata may be associated with discussion forum message 220. These fields and/or metadata may be analyzed and/or manipulated (e.g., written) to maintain read consistency, to honor threading practices, and so on.

Discussion forum message 220 may be stored in a data structure that is accessible to multiple accessing logics. For example, the data structure may be available to both an email logic 230 and a discussion forum logic 240. The data structure may be, for example, an IMAP shared folder. While a shared folder is described, it is to be appreciated that in some examples other shared access data structures may be employed. While a single email logic 230 is illustrated, in one example the email logic 230 may include independent and/or cooperating logics based on the Internet Message Access Protocol and/or the Simple Mail Transport Protocol. These independent and/or cooperating logics may be tasked with sending messages and/or receiving messages using different protocols. Similarly, while a single discussion forum logic 240 is illustrated, in one example a discussion forum logic may include a web browser logic, an RSS (Rich Site Summary) logic, and so on.

System 200 may also include a coordination logic 250 that is operably connected to data store 210. Coordination logic 250 may be configured to provide access to the discussion forum message 220 for both the email logic 230 and the discussion forum logic 240. In one example the coordination logic 250 may provide shared access control to discussion forum messages stored in an IMAP shared folder using RFC 2086 IMAP shared folder privileges. While RFC 2086 shared folder privileges are described it is to be appreciated that some examples may employ other data structures and other access control techniques and/or privileges. The access provided by the coordination logic 250 may include, for example, allowing a logic to read a message, to reply to a message, to delete a message, to restore a message, to block a message, to trace a thread associated with a message, and so on.

The coordination logic 250 may also be configured to maintain read status consistency for the discussion forum message 220 in both the email logic 230 and the discussion forum logic 240. Maintaining read consistency may involve, for example, manipulating values available to multiple logics, manipulating values in multiple logics, providing communications to multiple logics, receiving communications from multiple logics, and so on. The coordination logic 250 may also be configured to honor threading information associated with the discussion forum message 220. Honoring threading information may involve, for example, accessing links to other messages associated with a message to facilitate navigating through a thread.

In one example, in addition to maintaining read status consistency, coordination logic 250 may perform other tasks. For example, coordination logic 250 may enforce a policy concerning message size limits, allowable message types, and so on. Similarly, coordination logic 250 may also enforce privileges concerning read access, write access, delete access, and so on. Coordination logic 250 may also control the visibility of a message by controlling which user(s) is allowed to view the message. This function is related to controlling membership in a discussion forum.

Figure 3:
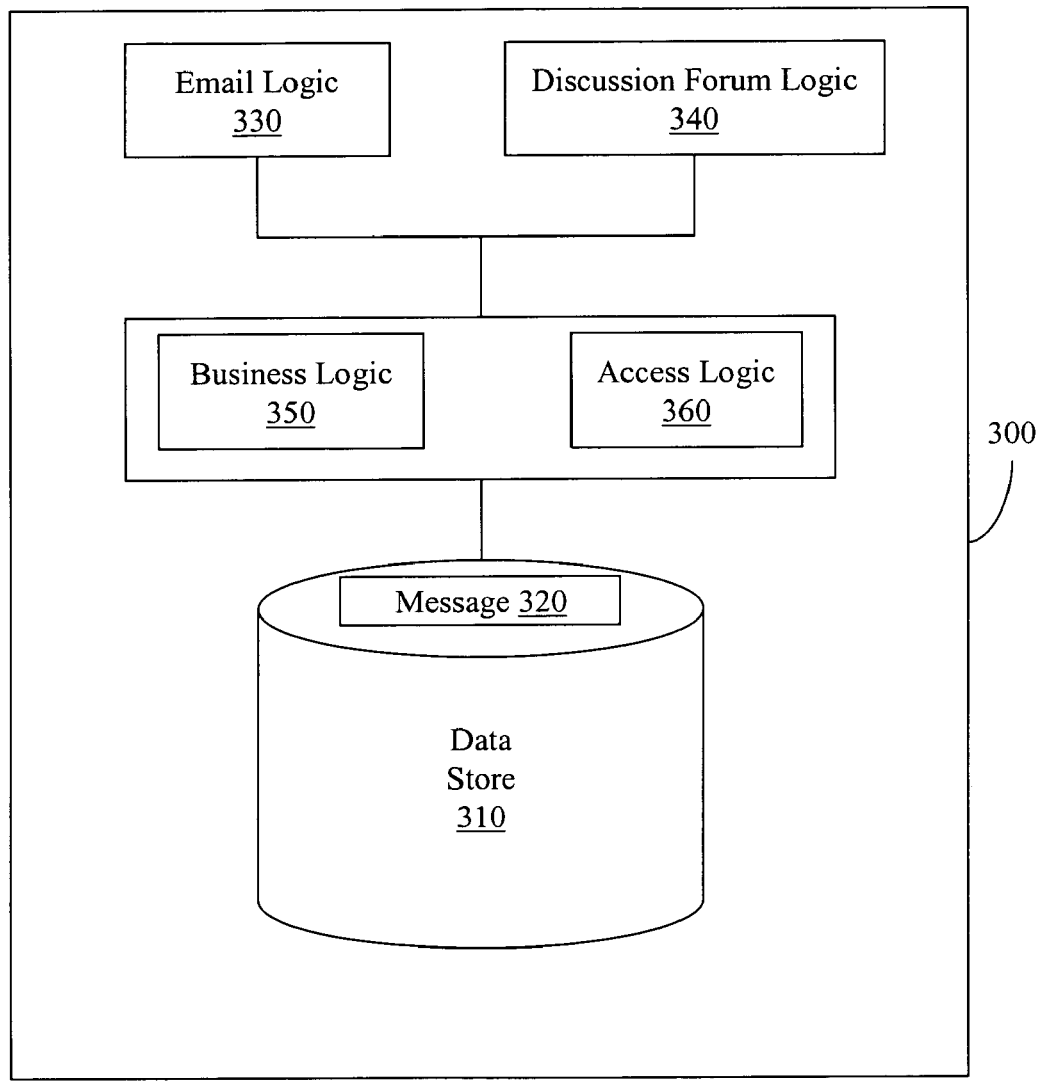
FIG. 3 illustrates an example email and discussion forum system.

FIG. 3 illustrates another example email and discussion forum system 300. System 300 includes some elements similar to those described in FIG. 2. For example, system 300 includes a data store 310 in which a message 320 may be stored. Data store 310 may be accessible to both an email logic 330 and a discussion forum logic 340. These logics may be operably connected to data store 310 through intervening logic.

Unlike system 200, system 300 includes the email logic 330 and the discussion forum logic 340. Additionally, the intervening logic in system 300 is partitioned into a business logic 350 and an access logic 360. Business logic 350 may perform a first set of tasks (e.g., enforcing policies) while access logic 360 may perform a second set of tasks (e.g., enforce privileges, control visibility). While the intervening logic is illustrated having two logics (e.g., 350, 360), it is to be appreciated that in some examples the tasks performed by these two logics may be distributed between an even greater number of logics.

In one example, system 300 implements forums as shared folders where a discussion forum is associated with an IMAP shared folder. A user can mount and access shared folders in an email client. In the example, system 300 also implements message threading. Messages posted by a discussion forum client are added to a shared folder. "References" and "in-reply-to" message headers (RFC 822) are populated to preserve threading information. In the example, system 300 also implements read tracking, where the read/unread status of a message is consistent between an email client and a discussion forum client. In the example, system 300 also implements shared access control where control information is based on IMAP shared folder privileges (RFC 2086). Therefore, users who can access a forum through a discussion forum client can also do so through an email (e.g., IMAP) client. In the example, system 300 also implements drag and drop functionality for shared folders. For example, a message can be dragged from one folder and dropped into another folder. This may facilitate, for example, a user adding to a discussion forum an email received from a user who is not participating in the discussion forum. For example, a corporate user may drag an email message sent to him by a client from his INBOX to a shared folder associated with a forum.

In one example, users of system 300 can participate in forum discussions through email. Users can send emails to a forum and the messages will be stored in a shared folder maintaining the threaded references. Users participating in the forum through emails will receive a copy of messages posted to the forum. In different examples the messages may be received in a folder associated with a discussion forum, in an inbox, and so on. The user may reply to the message using email and these replies may also be stored in the shared folder associated with the forum.

Figure 4:
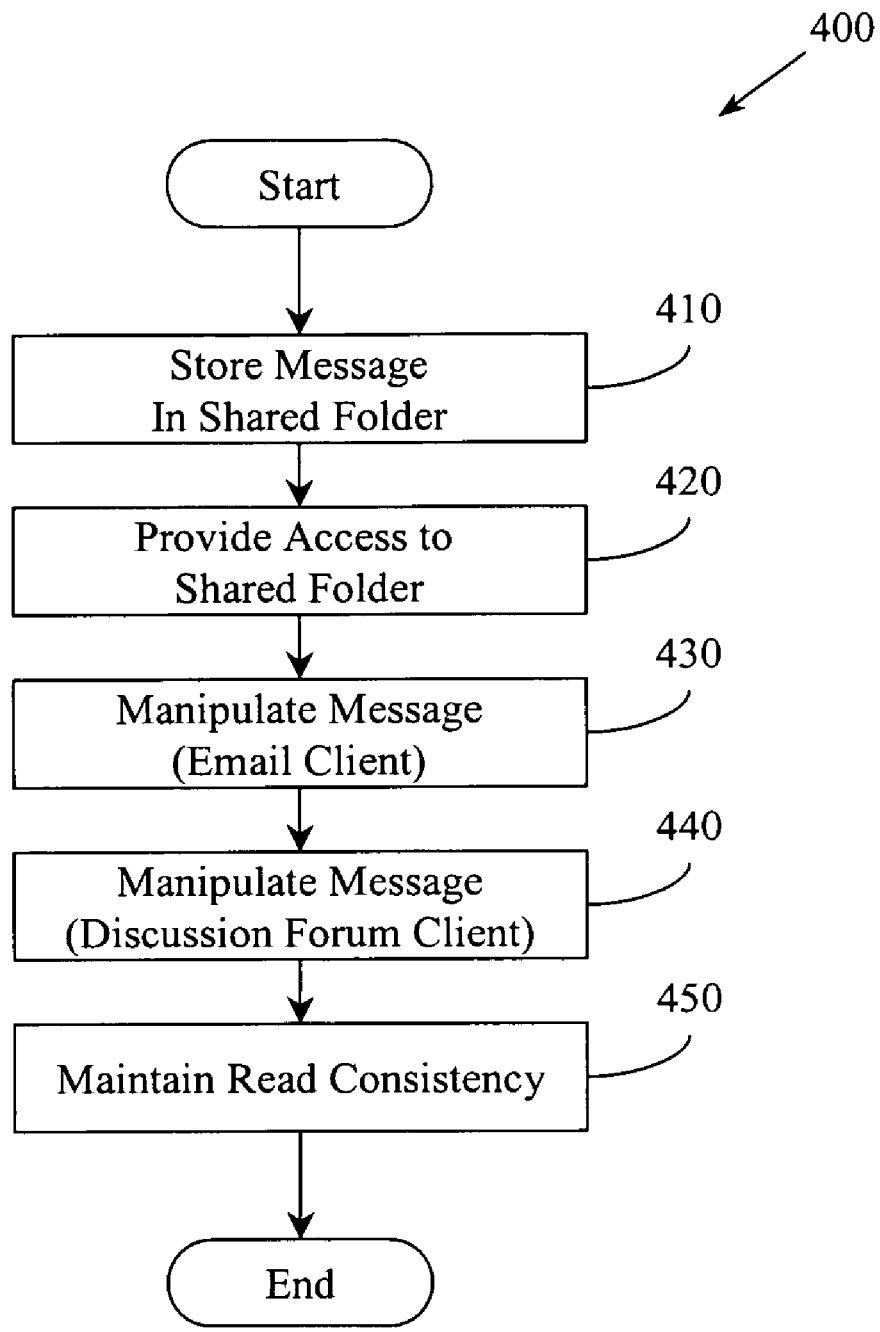
FIG. 4 illustrates an example method associated with shared access between an email application and a discussion forum application.

FIG. 4 illustrates a computer-implemented method 400 associated with interacting email and discussion forum logics. Method 400 may include, at 410, storing a discussion forum message in a shared folder. In one example, the shared folder may be an IMAP shared folder. The folder may reside, for example, in a database. Storing the message may involve, for example, writing to a database, providing data to a database interface, making a computer communication, interacting with an application programming interface, and so on.

Method 400 may also include, at 420, providing access to the shared folder. Clients to which access may be provided may include an email client and a discussion forum client. In one example, providing access may include providing shared access control to the discussion forum message stored in the IMAP shared folder using RFC 2086 IMAP shared folder privileges. Access may be provided selectively. For example, a discussion forum message may be made visible to a first user and/or a first email client while it is not made visible to a second user and/or second email client.

Method 400 may also include, at 430, selectively manipulating the discussion forum message in response to a computer communication from the email client. In one example, the computer communication may be received from the email client via an IMAP communication, via an SMTP communication, and so on. Method 400 may also include, at 440, selectively manipulating the discussion forum message in response to a computer communication from the discussion forum client. The computer communication may be received from the discussion forum client via an HTTP communication, via an RSS communication, and so on. Manipulating the message may include, for example, reading the message, replying to the message, deleting the message, restoring the message, blocking the message, tracing a thread associated with the message, and so on.

Method 400 may also include, at 450, maintaining read consistency for the discussion forum message. Read consistency may be maintained between logics including, for example, an email client and a discussion forum client. Maintaining read consistency may include, for example, updating a field in a data structure, manipulating a value in a database, manipulating a value in a logic(s), communicating a status to a logic(s), and so on.

Figure 5:
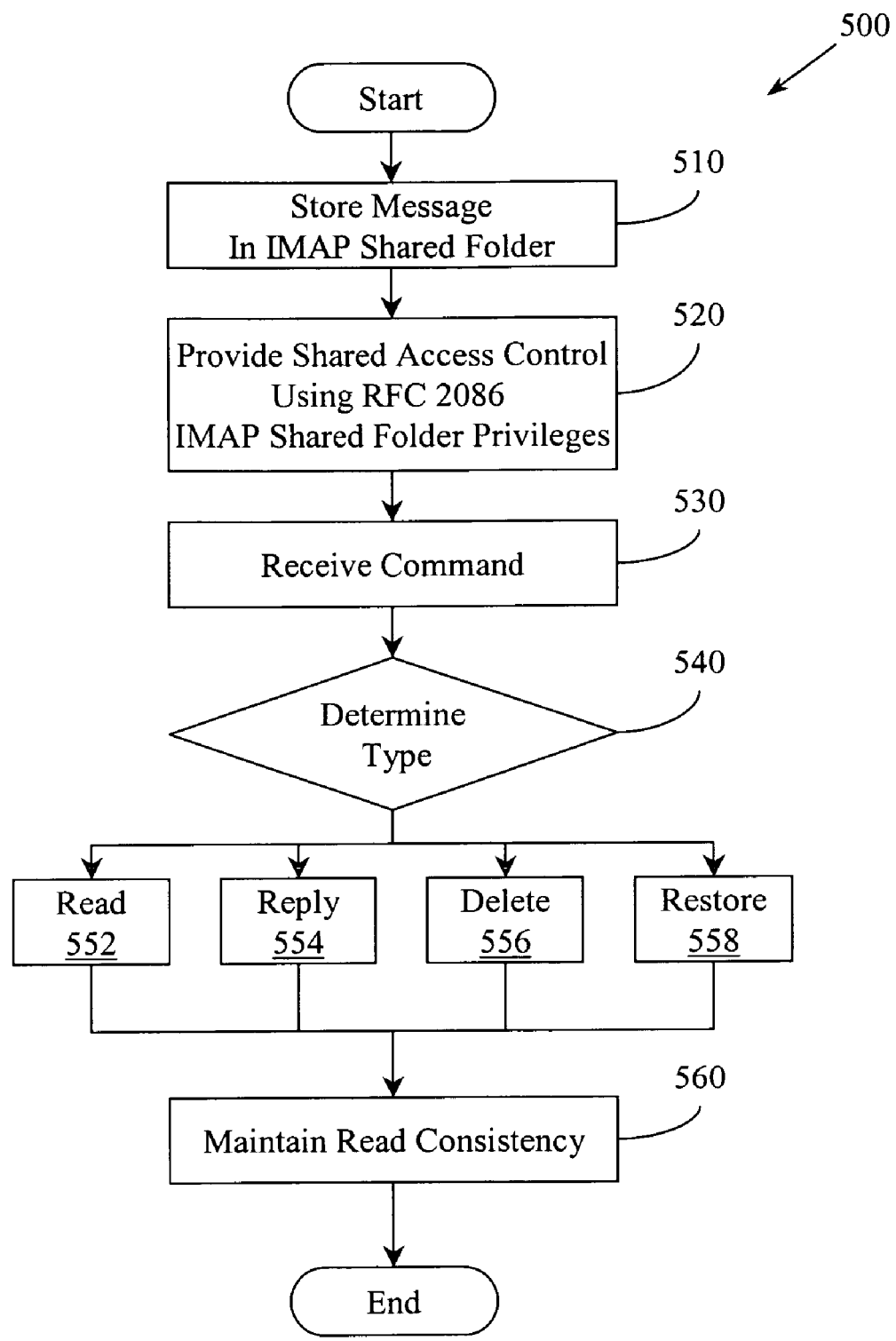
FIG. 5 illustrates an example method associated with shared access between an email application and a discussion forum application.

FIG. 5 illustrates another example method 500 associated with shared access between an email application and a discussion forum application. Method 500 may include, at 510, storing a discussion forum message in an IMAP shared folder. Method 500 may also include, at 520, providing shared access control to the shared folder using RFC 2086 IMAP shared folder privileges. Method 500 may also include, at 530, receiving a command to manipulate a message to which shared control is available and, at 540, determining the type of manipulation desired. Based on the determination at 540, a manipulation may be made at 552, 554, 556, and/or 558. While four manipulation types are illustrated, it is to be appreciated that other manipulations may be made. The manipulation(s) made at 552, 554, 556, and/or 558 may affect the read consistency and/or other attributes of a message. Thus, method 500 may also include, at 560, maintaining the read consistency of a message. Maintaining read consistency may involve, for example, updating a field in a data store, manipulating (e.g., reading, writing, changing) a field in a database, and so on.

Example methods may be implemented as processor executable instructions and/or operations stored on a computer-readable medium. Thus, in one example, a computer-readable medium may store processor executable instructions operable to perform a method that includes storing a discussion forum message in an IMAP shared folder, providing an email client and a discussion forum client with access to the IMAP shared folder, selectively manipulating the discussion forum message in response to a computer communication from the email client and/or the discussion forum client, and maintaining read consistency for the discussion forum message in the email client and the discussion forum client.

While the above method is described being stored on a computer-readable medium, it is to be appreciated that other example methods described herein may also be stored on a computer-readable medium.

Figure 6:
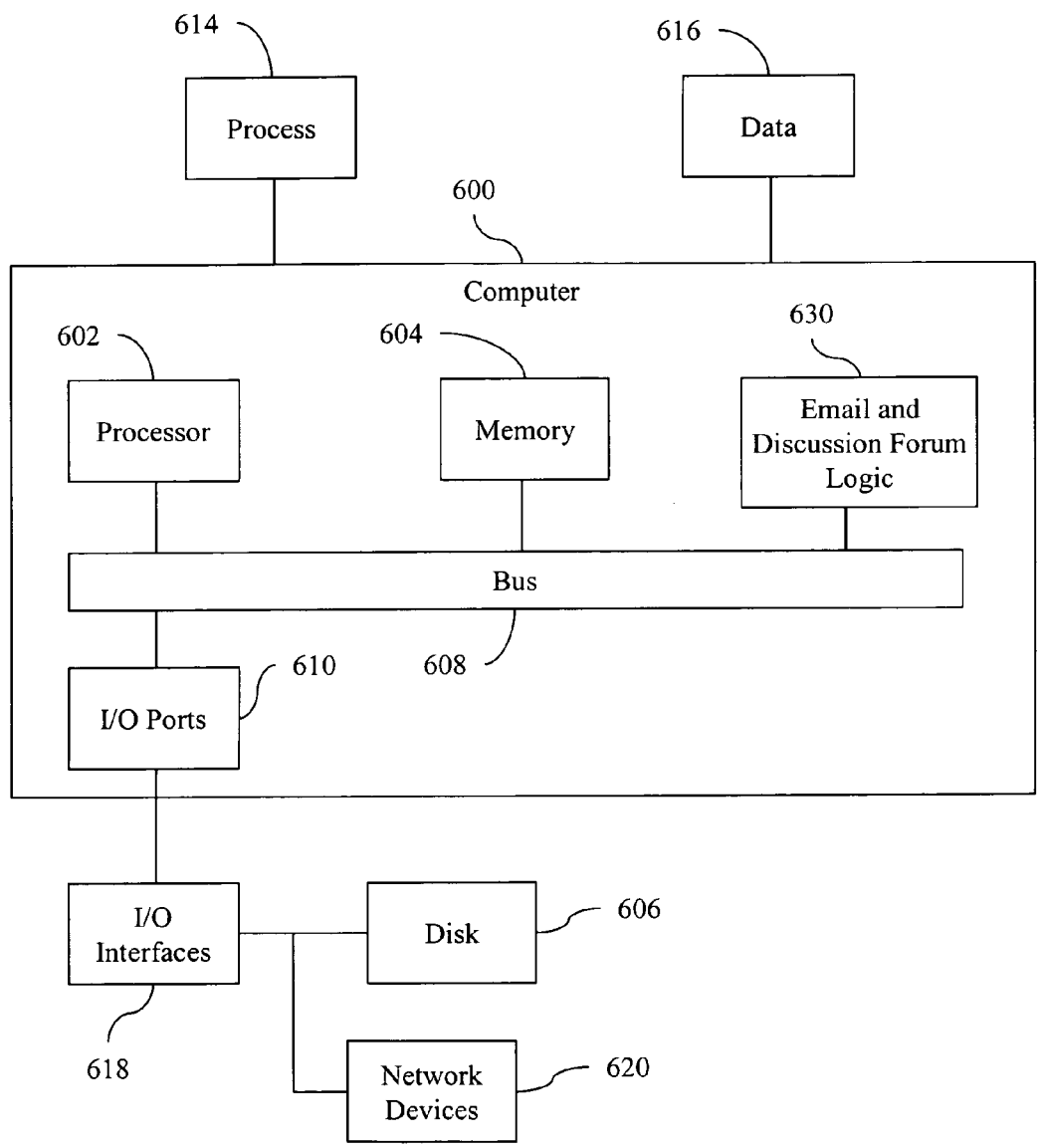
FIG. 6 illustrates an example computing environment in which example systems and methods illustrated herein may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, computer 600 may include an email and discussion forum logic 630 configured to facilitate email and discussion forum systems sharing data, logics and/or experiences. In different examples, logic 630 may be implemented in hardware, software, firmware, and/or combinations thereof. Thus, logic 630 may provide means (e.g., hardware, software, firmware) for providing shared storage for an email application and a discussion forum application, means (e.g., hardware, software, firmware) for providing shared access control to a discussion forum message accessible to the email application and the discussion forum application through the means for providing shared storage, and means (e.g., hardware, software, firmware) for maintaining read consistency for the discussion forum message using the means for providing shared access control. While logic 630 is illustrated as a hardware component attached to bus 608, it is to be appreciated that in one example, logic 630 could be implemented in processor 602.

Generally describing an example configuration of computer 600, processor 602 may be a variety of various processors including dual microprocessor and other multi-processor architectures. Memory 604 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), and direct RAM bus RAM (DRRAM).

Disk 606 may be operably connected to the computer 600 via, for example, an input/output interface (e.g., card, device) 618 and an input/output port 610. Disk 606 may be, for example, a magnetic disk drive, a solid state disk drive, a floppy disk drive, a tape drive, a Zip drive, a flash memory card, and/or a memory stick. Furthermore, disk 606 may be a CD-ROM, a CD recordable drive (CD-R drive), a CD rewriteable drive (CD-RW drive), and/or a digital video ROM drive (DVD ROM). Memory 604 can store processes 614 and/or data 616, for example. Disk 606 and/or memory 604 can store an operating system that controls and allocates resources of computer 600.

Bus 608 may be a single internal bus interconnect architecture and/or other bus or mesh architectures. While a single bus is illustrated, it is to be appreciated that computer 600 may communicate with various devices, logics, and peripherals using other busses (e.g., PCIE, SATA, Infiniband, 1394, USB, Ethernet). Bus 608 can be types including, for example, a memory bus, a memory controller, a peripheral bus, an external bus, a crossbar switch, and/or a local bus. The local bus may be, for example, an industrial standard architecture (ISA) bus, a micro-channel architecture (MSA) bus, an extended ISA (EISA) bus, a peripheral component interconnect (PCI) bus, a universal serial (USB) bus, and a small computer systems interface (SCSI) bus.

Computer 600 may interact with input/output devices via i/o interfaces 618 and input/output ports 610. Input/output devices may be, for example, a keyboard, a microphone, a pointing and selection device, cameras, video cards, displays, disk 606, network devices 620, and so on. Input/output ports 610 may include, for example, serial ports, parallel ports, and USB ports.

Computer 600 can operate in a network environment and thus may be connected to network devices 620 via i/o interfaces 618, and/or i/o ports 610. Through the network devices 620, computer 600 may interact with a network. Through the network, computer 600 may be logically connected to remote computers. Networks with which computer 600 may interact include, but are not limited to, a local area network (LAN), a wide area network (WAN), and other networks. In different examples, network devices 620 may connect to LAN technologies including, for example, fiber distributed data interface (FDDI), copper distributed data interface (CDDI), Ethernet (IEEE 802.3), token ring (IEEE 802.5), wireless computer communication (IEEE 802.11), and Bluetooth (IEEE 802.15.1). Similarly, network devices 620 may connect to WAN technologies including, for example, point to point links, circuit switching networks (e.g., integrated services digital networks (ISDN)), packet switching networks, and digital subscriber lines (DSL).

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
a data store, embodied on a non-transitory computer readable medium, configured to store at least one discussion forum message and at least one email message in a data structure that is accessible to both an email logic and a discussion forum logic, where a discussion forum message is a post to a discussion forum; and
a coordination logic operably connected to the data store, the coordination logic a being configured to provide shared access to the discussion forum message for both the email logic and the discussion forum logic, where the shared access provided by the coordination logic for the email logic includes providing the ability to perform one or more of, reading a discussion forum message, replying to a discussion forum message, deleting a discussion forum message, restoring a discussion forum message, blocking a discussion forum message, and tracing a thread associated with a discussion forum message using the email logic, to maintain read status consistency for the discussion forum message in both the email logic and the discussion forum logic, where the read status consistency is maintained by one of updating a field in a data structure, manipulating a value in a database, and manipulating a value in the email logic or the discussion forum logic, and to honor threading information associated with the discussion forum message, where the threading information is used to maintain discussion forum messages in a tree structure in the email logic as organized in the discussion forum logic.

2. The system of claim 1, the discussion forum message including an RFC (Request For Comment) 822 reference header field and an RFC 822 in-reply-to header field.

3. The system of claim 2, where the data structure is an IMAP (Internet Message Access Protocol) shared folder organized in the tree structure associated with the threading of the message.

4. The system of claim 3, the coordination logic being configured to provide shared access control to the discussion forum message stored in the IMAP shared folder using RFC 2086 IMAP shared folder privileges.

5. The system of claim 1, the email logic including one or more of, an IMAP (Internet Message Access Protocol) logic and an SMTP (Simple Mail Transport Protocol) logic.

6. The system of claim 5, the discussion forum logic including one or more of, a web browser logic, and an RSS (Rich Site Summary) logic.

7. The system of claim 1, the data store being a database.

8. The system of claim 7, the database being configured to store the discussion forum message, a discussion forum message definition, a user setting, a forum definition, an access control definition, and a policy definition.

9. The system of claim 8, the database being configured to store an instance of a category datatype, a forum datatype, a thread datatype, and a message datatype.

10. The system of claim 1, the coordination logic being configured to perform one or more of, enforcing a policy, enforcing a privilege, controlling visibility of a message, and controlling membership in a discussion forum.

11. The system of claim 1, the coordination logic being configured to perform one or more of, selectively providing access to the discussion forum message for the email logic, and providing drag and drop functionality for a shared folder associated with the email logic.

12. The system of claim 1, the system including the email logic and the discussion forum logic, the coordination logic being configured with a business logic and an access logic.

13. A computer configured with an email and discussion forum logic, the computer comprising:
- a database, embodied on a non-transitory computer readable medium, configured to store a discussion forum message, where a discussion forum message is a post to a discussion forum, having an RFC (Request For Comment) 822 reference header field and an RFC 822 in-reply-to header field and an email message in an IMAP (Internet Message Access Protocol) shared folder that is accessible to both an email logic and a discussion forum logic, the database being configured to store a discussion forum message, a discussion forum message definition, a user setting, a forum definition, an access control definition, and a policy definition; and
- a coordination logic operably connected to the database, the coordination logic being configured to provide shared access control to the discussion forum message stored in the IMAP shared folder using RFC 2086 IMAP shared folder privileges, to maintain read status consistency for the discussion forum message in both the email logic and the discussion forum logic, where the read status consistency is maintained by one of updating a field in a data structure, manipulating a value in a database, and manipulating a value in the email logic or the discussion forum logic, and to provide threading information associated with the discussion forum message used to maintain discussion forum messages in a tree structure in the email logic as organized by the discussion forum logic;
- the shared access control providing for reading a discussion forum message and one or more of replying to a discussion forum message, deleting a message, restoring a discussion forum message, blocking a discussion forum message, and tracing a thread associated with a discussion forum message.

14. A computer-implemented method, comprising:
- storing a discussion forum message, where a discussion forum message is a post to a discussion forum, and an email message in a shared folder;
- providing an email client and a discussion forum client with access to the shared folder;
- selectively manipulating the discussion forum message in response to a computer communication from the email client;
- selectively manipulating the discussion forum message in response to a computer communication from the discussion forum client;
- where manipulating a discussion forum message includes reading the discussion forum message and one or more of, replying to the discussion forum message, deleting the discussion forum message, restoring the discussion forum message, blocking the discussion forum message, and tracing a thread associated with the discussion forum message; and
- maintaining read status consistency for the discussion forum message in the email client and the discussion forum client, where the read status consistency is maintained by one of updating a field in a data structure, manipulating a value in a database, and manipulating a value in a logic; and
- providing threading information associated with the discussion forum message that is used to maintain the discussion forum message in a tree structure in the email client as organized in the discussion forum client.

15. The method of claim 14, the shared folder being an IMAP shared folder, the method including providing shared access control to the discussion forum message stored in the IMAP shared folder using RFC 2086 IMAP shared folder privileges.

16. The method of claim 15, the computer communication from the email client being received via one or more of, an IMAP communication, and an SMTP communication, the computer communication from the discussion forum client being received via one or more of, an HTTP communication, and an RSS communication.

17. A non-transitory computer-readable medium storing processor executable instructions operable to perform a method, the method comprising:
- storing a discussion forum message in a shared folder, where a discussion forum message is a post to a discussion forum;
- providing an email client and a discussion forum client with shared access to the shared folder;
- selectively manipulating the discussion forum message in response to a computer communication from the email client;
- selectively manipulating the discussion forum message in response to a computer communication from the discussion forum client;
- where manipulating a discussion forum message includes reading the discussion forum message and one or more of, replying to the discussion forum message, deleting the discussion forum message, restoring the discussion forum message, blocking the discussion forum message, and tracing a thread associated with the discussion forum message; and
- maintaining read status consistency for the discussion forum message in the email client and the discussion forum client, where the read status consistency is maintained by one of updating a field in a data structure, manipulating a value in a database, and manipulating a value in a logic; and
- providing threading information associated with the discussion forum message used to maintain the discussion forum message in a tree structure in the email client as organized in the discussion forum client.

18. A system, comprising:
- means for providing shared storage for an email application and a discussion forum application in a shared folder;
- means for providing shared access control to a discussion forum message accessible to the email application and the discussion forum application through the shared folder, where a discussion forum message is a post to a discussion forum, and further where access control to a discussion forum message includes reading the discussion forum message and one or more of, replying to the discussion forum message, deleting the discussion forum message, restoring the discussion forum message, blocking the discussion forum message, and tracing a thread associated with the discussion forum message;

means for maintaining read status consistency for the discussion forum message using the means for providing shared access control, where the read status consistency is maintained by one of updating a field in a data structure, manipulating a value in a database, and manipulating a value in a logic; and means for providing threading information associated with the discussion forum message used to maintain the discussion forum message in a tree structure in the email application as organized in the discussion forum application.

19. The non-transitory computer-readable medium of claim 17, where the shared folder comprises an IMAP shared folder, the method including providing shared access control to the discussion forum message stored in the IMAP shared folder using RFC 2086 IMAP shared folder privileges.

20. The non-transitory computer-readable medium of claim 19, the computer communication from the email client being received via one or more of, an IMAP communication, and an SMTP communication, the computer communication from the discussion forum client being received via one or more of, an HTTP communication, and an RSS communication.

\* \* \* \* \*

UNITED STATES PATENT AND TRADEMARK OFFICE
CERTIFICATE OF CORRECTION

| | | |
|---|---|---|
| PATENT NO. | : 8,112,478 B2 | |
| APPLICATION NO. | : 11/374402 | |
| DATED | : February 7, 2012 | |
| INVENTOR(S) | : Carrer et al. | |

It is certified that error appears in the above-identified patent and that said Letters Patent is hereby corrected as shown below:

In column 3, line 41, delete "With" and insert -- with --, therefor.

In column 5, line 18-19, delete "servelet," and insert -- servlet, --, therefor.

In column 11, line 32, delete "(MSA)" and insert -- (MCA) --, therefor.

Signed and Sealed this
First Day of May, 2012

David J. Kappos
*Director of the United States Patent and Trademark Office*